(12) United States Patent
Jo et al.

(10) Patent No.: US 12,151,671 B2
(45) Date of Patent: Nov. 26, 2024

(54) HYBRID ELECTRIC VEHICLE AND METHOD OF CONTROLLING SAME

(71) Applicants: HYUNDAI MOTOR COMPANY, Seoul (KR); KIA CORPORATION, Seoul (KR)

(72) Inventors: Min Gyun Jo, Ansan-si (KR); Hoon Han, Hwaseong-si (KR); Han Nah Song, Daejeon (KR); Jae Young Choi, Seoul (KR); Gwang Il Du, Ansan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 217 days.

(21) Appl. No.: 17/975,273

(22) Filed: Oct. 27, 2022

(65) Prior Publication Data

US 2023/0373466 A1    Nov. 23, 2023

(30) Foreign Application Priority Data

May 19, 2022    (KR) .................. 10-2022-0061526

(51) Int. Cl.
*B60W 20/10* (2016.01)
*B60W 10/06* (2006.01)
*B60W 10/08* (2006.01)
*B60W 20/50* (2016.01)

(52) U.S. Cl.
CPC ............ *B60W 20/50* (2013.01); *B60W 10/06* (2013.01); *B60W 10/08* (2013.01); *B60W 20/10* (2013.01); *B60W 2510/0657* (2013.01); *B60W 2510/083* (2013.01); *B60W 2710/083* (2013.01)

(58) Field of Classification Search
CPC ...... B60W 10/06; B60W 10/08; B60W 20/10; B60W 20/50; B60W 2510/0657; B60W 2510/083; B60W 2710/083
See application file for complete search history.

(56) References Cited

U.S. PATENT DOCUMENTS

| | | | |
|---|---|---|---|
| 6,702,053 B2 | 3/2004 | Nogi et al. | |
| 6,991,052 B2 | 1/2006 | Nogi et al. | |
| 7,101,308 B2 | 9/2006 | Joe et al. | |
| 7,373,933 B2 | 5/2008 | Kamada et al. | |
| 7,441,617 B2 | 10/2008 | Nogi et al. | |
| 8,215,424 B2 | 7/2012 | Kaita | |
| 9,827,842 B2 * | 11/2017 | Blasinski | B60W 10/08 |
| 10,328,817 B2 | 6/2019 | Hata et al. | |

(Continued)

FOREIGN PATENT DOCUMENTS

| | | |
|---|---|---|
| CN | 109849890 A | 6/2019 |
| EP | 1065362 B1 | 6/2010 |

(Continued)

*Primary Examiner* — Edwin A Young
(74) *Attorney, Agent, or Firm* — Lempia Summerfield Katz LLC

(57) ABSTRACT

Proposed is a method of controlling a hybrid electric vehicle. In particular, the method includes: connecting a first motor directly connected with an engine with a second motor directly connected with an input end of a transmission, and determining whether to distribute an amount of error torque for the engine to the first motor or each of the first motor and the second motor on the basis of an efficiency of the first motor and an efficiency of the second motor.

19 Claims, 6 Drawing Sheets

(56) References Cited

U.S. PATENT DOCUMENTS

| | | |
|---|---|---|
| 11,292,451 B2 | 4/2022 | Yokota et al. |
| 2001/0037905 A1 | 11/2001 | Nogi et al. |
| 2002/0070060 A1 | 6/2002 | Nogi et al. |
| 2002/0175011 A1 | 11/2002 | Nogi et al. |
| 2006/0113130 A1 | 6/2006 | Nogi et al. |
| 2006/0270519 A1 | 11/2006 | Kamada et al. |
| 2008/0110684 A1 | 5/2008 | Kaita |
| 2009/0203481 A1* | 8/2009 | Nohara ................ B60W 10/06 903/945 |
| 2010/0069196 A1* | 3/2010 | Shibata ................ F02D 29/02 477/3 |
| 2016/0193938 A1 | 7/2016 | Hata et al. |
| 2016/0368479 A1 | 12/2016 | Kim et al. |
| 2019/0126908 A1 | 5/2019 | Yokota et al. |
| 2020/0139986 A1* | 5/2020 | Hoshiya ................ B60K 6/445 |

FOREIGN PATENT DOCUMENTS

| | | |
|---|---|---|
| JP | 2006327509 A | 12/2006 |
| JP | 2007055475 A | 3/2007 |
| JP | 2008105532 A | 5/2008 |
| JP | 2019081467 A | 5/2019 |
| KR | 101752111 B1 | 6/2017 |
| KR | 20190052297 A | 5/2019 |

\* cited by examiner

HYBRID ELECTRIC VEHICLE AND METHOD OF CONTROLLING SAME

CROSS-REFERENCE TO RELATED APPLICATION

The present application claims priority to Korean Patent Application No. 10-2022-0061526, filed May 19, 2022, the entire contents of which are incorporated herein by reference.

BACKGROUND

1. Technical Field

The present disclosure relates generally to a hybrid electric vehicle and a method of controlling the same, capable of improving fuel economy by efficiently compensating error torque of an engine through a plurality of motors.

2. Related Art

As attention to an environment has recently been increased, the demand for ecofriendly vehicle has been increased. The ecofriendly vehicle has an electric motor to drive the vehicle. The ecofriendly vehicle includes, for example, an electrified vehicle, and a hybrid electric vehicle (HEV) or an electric vehicle (EV).

The HEV uses two power sources: an engine and an electric motor, and may determine an optimal output and torque to harmoniously operate the engine and the electric motor in a process of generating a driving power of the vehicle.

Especially, in a hybrid vehicle which employs a parallel type or a transmission mounted electric drive (TMED) type hybrid system in which an electric motor and an engine clutch (EC) are mounted between an engine and a transmission, an output of the engine and an output of the electric motor may be transmitted to a drive shaft at the same time.

We have discovered that when the HEV is driven using the engine as a drive source, an error may occur between a torque command for the engine and an output torque. When this error occurred, it should be efficiently compensated through the electric motor.

The foregoing is intended merely to aid in the understanding of the background of the present disclosure, and is not intended to mean that the present disclosure falls within the purview of the related art that is already known to those having ordinary skill in the art.

SUMMARY

The present disclosure provides a motor to compensate for an error torque of an engine according to efficiency of each of multiple motors. The present disclosure distributes an amount of error torque of the engine to a motor selected among the multiple motors, thereby reducing or minimizing loss generated in compensating the error torque for the engine and thus improving fuel economy.

The technical problems to be achieved in the present disclosure are not limited to the aforementioned description, and other unmentioned technical problems should be clearly understood to a person having ordinary skill in the art from the description provided hereinafter.

In order to achieve the above objectives, according to one aspect of the present disclosure, there is provided a method of controlling a hybrid electric vehicle. In an embodiment of the present disclosure, the method includes: connecting a first motor directly connected with an engine with a second motor directly connected with an input end of a transmission; and determining whether to distribute an amount of error torque for the engine to the first motor or to each of the first motor and the second motor on the basis of an efficiency of the first motor and an efficiency of the second motor.

In another embodiment of the present disclosure, a hybrid electric vehicle (HEV) includes: an engine; a first motor directly connected with the engine; a second motor selectively connected with the first motor; a transmission including an input end which is directly connected with the second motor; and a control unit configured to determine whether to distribute an amount of error torque for the engine to the first motor or each of the first motor and the second motor on the basis of an efficiency of the first motor and an efficiency of the second motor.

The present disclosure may reduce or minimize loss generated in compensating the error torque for the engine and thus improve fuel economy by selecting a motor to compensate an error torque for an engine according to efficiency of each of multiple motors, and by distributing an amount of error torque for the engine to the selected motor.

Further, by compensating the error torque for the engine through the motor directly connected to the engine, the error torque for the engine may be precisely compensated.

The effects can be obtained from the present disclosure is not limited to the aforementioned description, and other objectives not explicitly disclosed herein should be clearly understood by a person having ordinary skill in the art from the description provided hereinafter.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
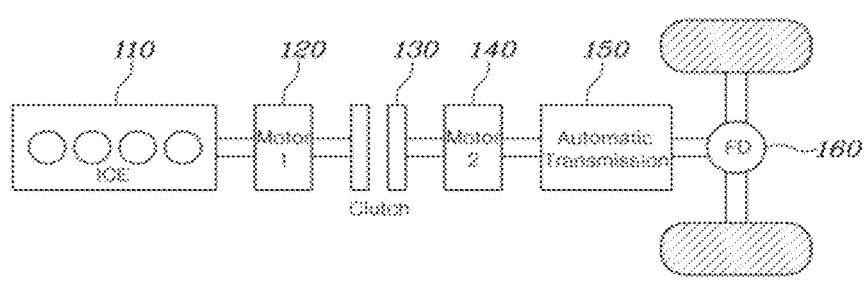
FIG. 1 illustrates an example of a power train configuration for an HEV according to an embodiment of the present disclosure.

Hereinafter, embodiments disclosed in the present disclosure are described in detail. However, identical or similar constituent elements are given the same reference numerals regardless of the reference numerals of the drawings, and repeated description thereof has been omitted. The component suffixes "module" and "part" used in the following description are given or mixed together only considering the ease of creating the specification, and have no meanings or roles that are distinguished from each other by themselves. Further, in the description of the present disclosure, when it is determined that the detailed description of the related art would obscure the gist of the present disclosure, the detailed description thereof has been omitted. Further, the attached drawings are merely intended to be able to readily understand the embodiments disclosed herein, and thus the technical idea disclosed herein is not limited by the attached drawings, and it should be understood to include all changes, equivalents, and substitutions included in the idea and technical scope of the present disclosure.

It will be understood that, although the terms including ordinal numbers such as "first", "second", etc. may be used herein to describe various elements, these elements should not be limited by these terms. These terms are only used to distinguish one element from another element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

As used herein, the singular forms "a", "an", and "the" are intended to include the plural forms as well, unless the context clearly indicates otherwise.

It should be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Further, a unit included in the name such as a motor control unit (MCU), a hybrid control unit (HCU), or the like or a control unit is merely a term widely used for the names of controllers for controlling specified functions for vehicles, and does not refer to a generic function unit. For example, each control unit may include a communication device that communicates with other control units or sensors for control of functions in charge, a memory that stores an operating system or logic commands, input/output information, etc., and one or more processors that conduct determination, operation, decision, etc. required to control the functions in charge.

"When a component, device, element, or the like of the present disclosure is described as having a purpose or performing an operation, function, or the like, the component, device, or element should be considered herein as being "configured to" meet that purpose or to perform that operation or function.

Prior to describing a motor drive control system configuration for an electrified vehicle according to embodiments of the present disclosure, and a motor drive control method of the electrified vehicle, a structure and a control system of the electrified vehicle that may be applied to the embodiments are described first.

FIG. 1 illustrates an example of a power train configuration for an HEV according to an embodiment of the present disclosure.

Referring to FIG. 1, a power train for an HEV employing a parallel type hybrid system in which two motors (i.e., "a first Motor 1" 120 and "a second Motor 2" 140) and an engine clutch 130 are mounted between an internal combustion engine (ICE) 110 and a transmission 150 is illustrated. This parallel type hybrid system is referred to as a transmission mounted electric drive (TMED) hybrid system because the second motor 140 is always connected to an input end of the transmission 150 at ordinary times.

Here, the first motor 120 is disposed between one end of the engine 110 and one end of the engine clutch 130, and an engine shaft of the engine 110 and a first motor shaft of the first motor 120 are mutually directly connected, and may be rotated together at ordinary times.

One end of a second motor shaft of the second motor 140 is connected with the other end of the engine clutch 130, and the other end of the second motor shaft may be directly connected with the input end of the transmission 150. The second motor 140 may be selectively connected with the first motor 120 according to the drive mode.

In comparison with the first motor 120, the second motor 140 has greater output, and the second motor 140 may conduct a role of the driving motor. Further, the first motor 120 performs a function of a starter motor that cranks the engine 110 to start the engine 110, and may store energy of the engine 110 through electric power generation at an off time. The first motor 120 may perform electric power generation using power of the engine 110 in a state in which the engine 110 is running.

In a case where a driver steps on a gas pedal (e.g., an acceleration pedal) after starting (e.g., HEV Ready) in the HEV having a power train as illustrated in FIG. 1, the second motor 140 is driven using the electric power of the battery (not illustrated). Accordingly, wheels are moved by the power of the second motor 140 via the transmission 150 and a final drive (FD) 160 (i.e., an EV mode). When a gradually greater driving force is required while the vehicle is gradually accelerated, the first motor 120 is operated to be able to crank the engine 110.

Only if the engine 110 is started and then a difference in rotation speed between the engine 110 and the second motor 140 becomes within a given range, the engine clutch 130 is engaged, and the engine 110 and the second motor 140 are rotated together (i.e., transition from the EV mode to the HEV mode). Accordingly, output of the second motor 140 is lowered while going through a torque blending process, and request torque of a driver may be satisfied while output of the engine 110 is raised. In the HEV mode, the engine 110 may satisfy most of the request torque, and a difference between the torque and the request torque may be compensated through at least one of the first motor 120 and the second motor 140. For example, in a case in which the engine 110 outputs torque higher than the request torque with consideration for efficiency of the engine 110, the first motor 120 or the second motor 140 generates electricity as much as an engine torque surplus. In a case in which the engine torque is shorter than the request torque, at least one of the first motor 120 and the second motor 140 may output torque corresponding to a shortage.

If preset engine OFF conditions such as deceleration, etc. of the vehicle are satisfied, the engine clutch 130 is opened, and the engine 110 is stopped (i.e., the transition from the HEV mode to the EV mode). At the time of deceleration, the battery is charged through the second motor 140 using the drive force of the wheels, which is referred to as braking energy regeneration or regenerative braking.

In general, as the transmission 150, a Steptronic transmission or a multiple disc clutch, for example, a dual clutch transmission (DCT), may be used.

Figure 2:
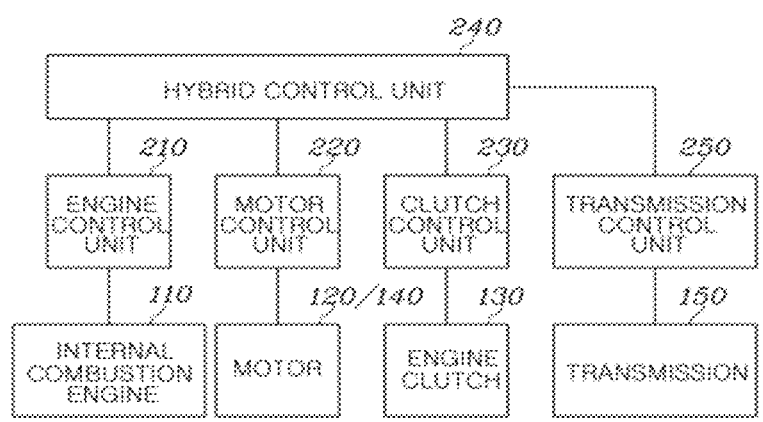
FIG. 2 illustrates an example of the control system configuration of the HEV according to an embodiment of the present disclosure.

FIG. 2 illustrates an example of the control system configuration of the HEV according to an embodiment of the present disclosure.

Referring to FIG. 2, an engine control unit 210 controls an internal combustion engine 110 in the HEV to which the embodiments of the present disclosure may be applied. The torque of the first motor 120 and the torque of the second motor 140 may be controlled by a motor control unit (MCU) 220, and the engine clutch 130 may be controlled by a clutch control unit 230. Here, the engine control unit 210 is referred to as an engine management system (EMS). Further, the transmission 150 is controlled by a transmission control unit 250.

The MCU 220 may control a gate drive unit (not illustrated) using a control signal having a pulse width modulation (PWM) form on the basis of a motor angle, a phase voltage, a phase current, a request torque, and so on. Accordingly, the gate drive unit may control inverters (not illustrated) that drive the motors 120 and 140, respectively.

Each control unit is connected with a hybrid controller unit (HCU) 240 and performs operations depending on control signals from the HCU 240 The HCU 240 controls a whole power train including a mode conversion process, as an upper level control unit. Under the control of the HCU 240, a drive mode is changed, and the control units provide the HCU 240 with information required for the engine clutch control when performing gear shift, and/or information required for engine stop control.

For example, the HCU 240 determines whether or not to perform conversion between EV-HEV mode or between CD-CS modes (in the case of the PHEV) according to the drive state of the vehicle. To this end, the HCU 240 determines an open point in time of the engine clutch 130, and performs hydraulic control. Further, the HCU 240 determines a state (lock-up, slip, open, or the like) of the engine clutch 130, and may control a fuel injection stop point in time. Further, the HCU 240 may transmit a torque command for controlling the torque of the first motor 120 for the engine stop control, and control engine rotation energy recovery. In addition, the HCU 240 determines a state of each of the drive sources 110, 120 and 140 in order to satisfy the request torque, and accordingly decides request driving forces which the drive sources 110, 120 and 140 share. The HCU 240 may transmit the torque commands to the engine control units 210 and 220.

Of course, it is apparent to those having ordinary skill in the art that the connection relation between the aforementioned control units and the functions/divisions of the control units is illustrative, and names thereof are not limited. For example, the HCU 240 may be embodied such that the corresponding function is replaced and provided at any one of the other control units excluding the same, and the corresponding functions may be distributed and provided at two or more of the other control units.

The aforementioned configurations of FIGS. 1 and 2 are one configuration example of the HEV, and the HEV applicable to the embodiments is not limited to this structure.

When the drive mode of the HEV is set to the HEV mode, an error torque corresponding to a difference between a torque (e.g., a torque command) which the HCU 240 distributes to the engine 110 and an actual torque output from the engine 110 may occur. The error torque needs to be compensated through at least one of the first motor 120 and the second motor 140.

In an embodiment of the present disclosure, by selecting the motor to compensate the error torque with respect to the engine 110 according to efficiency of each of the plurality of motors 120 and 140 in the HEV mode, and by distributing an amount of error torque for the engine 110 to the selected motor, a proposal is made for the HEV capable of minimizing loss generated when the error torque for the engine 110 is compensated and able to improve fuel efficiency. A structure for the HEV is illustrated in FIG. 3.

Figure 3:
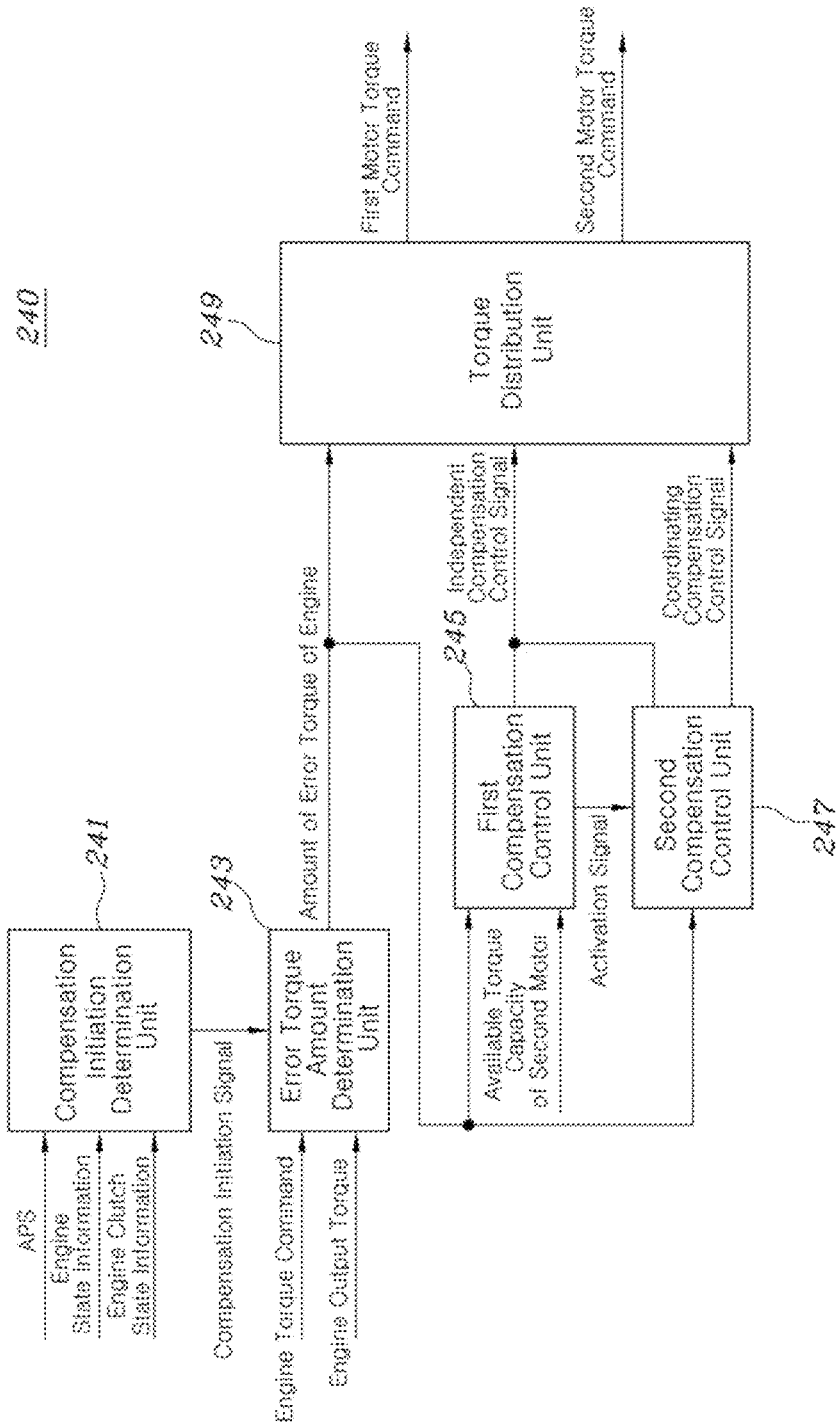
FIG. 3 is a block diagram illustrating a configuration of a hybrid control unit according to an embodiment of the present disclosure.

FIG. 3 is a block diagram illustrating a configuration of the HCU 240 according to an embodiment of the present disclosure.

Referring to FIG. 3, the HCU 240 may include a compensation initiation determination unit 241, an amount of error torque determination unit 243, a first compensation control unit 245, a second compensation control unit 247, and a torque distribution unit 249.

The compensation initiation determination unit 241 determines whether or not to enter an operation of compensating the error torque for the engine 110 through at least one of the first motor 120 and the second motor 140 on the basis of a value of an acceleration pedal sensor (APS), engine state information, and engine clutch state information. The compensation initiation determination unit 241 may activate a compensation initiation signal according to a result of the determination.

First, the compensation initiation determination unit 241 may determine whether or not a driver requests acceleration of the vehicle on the basis of a value of an acceleration pedal sensor (APS). In a case in which it is determined that the acceleration of the vehicle is requested, the compensation initiation determination unit 241 determines whether or not to start the engine 110 on the basis of the engine state information, and determines whether or not to lock up the engine clutch 130 on the basis of the engine clutch state information, and thereby the compensation initiation signal may be activated when the engine 110 is started and the engine clutch 130 is locked up. In other words, the compensation initiation signal is activated when the first motor 120 directly connected with the engine 110 in the HEV mode is connected with the second motor 140 directly connected to a transmission input end through fastening of the engine clutch 130.

When the compensation initiation signal is activated, the error torque amount determination unit 243 may determine a difference between a torque command value of the engine 110 and an output torque value of the engine 110 as an amount of the error torque of the engine 110. Here, a value of the output torque of the engine 110 may be derived by an algorithm by which correlation between the torque command of the engine 110 and the output torque for the engine 110, but not necessarily limited thereto.

The first compensation control unit 245 and the second compensation control unit 247 may select at least one motor, among the plurality of motors 120 and 140, to compensate for the error torque of the engine 110.

Each of the plurality of motors 120 and 140 may have different efficiency depending on an operation point. To be more specific, the efficiency of the first motor 120 may be higher than that of the second motor 140 in a low output operation point region, and the efficiency of the second motor 140 may be higher than that of the first motor 120 in a high output operation point region. The low output operation point region refers to an operation point region in which the output torque of the motor is lower than the high output operation point region.

Since the first motor 120 is directly connected to the engine 110, the error torque for the engine 110 may be precisely compensated. Since the first motor 120 has higher efficiency in the low output operation point region compared to the second motor 140, the error torque for the engine 110 changed in real time may be efficiently compensated in the low output operation point region.

However, when the output operation point of the first motor 120 is shifted to the high operation point region from the low output operation point region, the efficiency of the first motor 120 is lower than that of the second motor 140. For this reason, when the error torque for the engine 110 is compensated only through the first motor 120, a problem in that an amount of loss is increased may be generated.

In order to solve this problem, the error torque for the engine 110 is compensated through the first motor 120 as well as the second motor 140 in consideration of the efficiency of the first motor 120 and the efficiency of the second motor 140, and thereby it is possible to reduce a generated amount of loss compared to the case in which the error torque for the engine 110 is compensated through the first motor 120 only.

Accordingly, there is a need to decide whether or not to distribute the amount of the error torque for the engine 110 to the first motor 120 or to each of the first motor 120 and the second motor 140 on the basis of the efficiency of the first motor 120 and the efficiency of the second motor 140. A structure for this corresponds to the second compensation control unit 247.

Before the second compensation control unit 247 decides the motor to compensate for the error torque of the engine 110, the first compensation control unit 245 may determine through the second motor 140 whether to be able to compensate for the error torque of the engine 110.

To be more specific, the first compensation control unit 245 compares the amount of the error torque for the engine 110 with an available torque capacity of the torque of the second motor 140, and thereby it is possible to determine whether the amount of the error torque for the engine 110 may be compensated through the second motor 140. Here, the available torque capacity of the second motor 140 may be a difference between a torque limit amount of the second motor 140 and an output torque value of the second motor 140.

First, the first compensation control unit 245 may be activated when the amount of the error torque for the engine 110 exceeds a preset threshold value.

When the amount of the error torque for the engine 110 exceeds the available torque capacity of the second motor 140 in the state in which the first compensation control unit 245 is activated, it may be determined that the amount of the error torque for the engine 110 may not be compensated. In this case, the first compensation control unit 245 may transmit an independent compensation control signal to the torque distribution unit 249 so as to compensate the error torque for the engine 110 through the first motor 120 only.

On the contrary, when the amount of the error torque for the engine 110 is less than or equal to the available torque capacity of the second motor 140 in the state in which the first compensation control unit 245, it may be determined that the amount of the error torque for the engine 110 may be compensated through the second motor 140. In this case, the first compensation control unit 245 may transmit an activation signal to the second compensation control unit 247 such that the second compensation control unit 247 decides the motor to compensate the error torque for the engine 110.

When the second compensation control unit 247 receives the activation signal, it is possible to decide whether or not to distribute the amount of the error torque for the engine 110 to the first motor 120 or each of the first motor 120 and the second motor 140 on the basis of the efficiency of the first motor 120 and the efficiency of the second motor 140.

First, the second compensation control unit 247 may determine a first loss quantity generated when the amount of the error torque for the engine 110 is distributed to the first motor 120 on the basis of the efficiency of the first motor 120, and determine a second loss quantity generated when the amount of the error torque for the engine 110 is distributed to each of the first motor 120 and the second motor 140 on the basis of the efficiency of the first motor 120 and the efficiency of the second motor 140. Here, the second compensation control unit 247 may refer to a loss map for a revolution per minute (RPM) and the motor drive system.

Thereafter, when the first loss quantity is less than or equal to the second loss quantity, the second compensation control unit 247 may transmit an independent compensation control signal to the torque distribution unit 249 so as to distribute the error torque for the engine 110 to the first motor 120.

On the other hand, when the first loss quantity exceeds the second loss quantity, the second compensation control unit 247 may transmit the coordinating compensation control signal to the torque distribution unit 249 so as to distribute the amount of the error torque for the engine 110 to each of the first motor 120 and the second motor 140. Here, the coordinating compensation control signal may include information about the optimum operation point of each of the first motor 120 and the second motor 140 at which an energy loss of the motor drive system is minimized.

When receiving the independent compensation control signal, the torque distribution unit 249 distributes the error torque amount for the engine 110 to the first motor 120, and may output a first motor torque command to the motor control unit 220 on the basis of this distribution. Further, when receiving the coordinating compensation control signal, the torque distribution unit 249 distributes the error torque amount of the engine 110 to each of the first motor 120 and the second motor 140 according to an optimum operation point, and may output a first motor torque command and a second motor torque command to the motor control unit 220 on the basis of this distribution.

Figure 4:
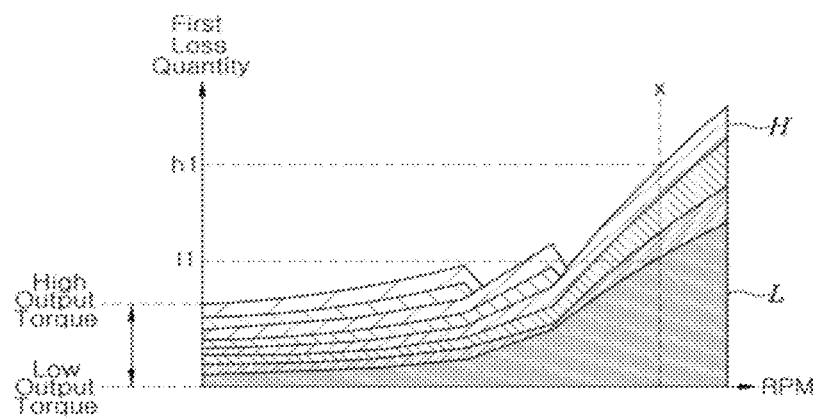
FIGS. 4 and 5 are graphs for explaining loss quantities of motors provided to the HEV according to an embodiment of the present disclosure.
Figure 5:
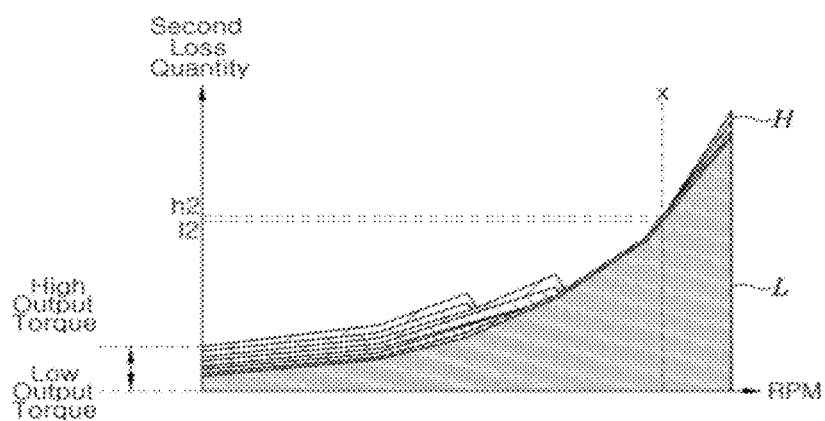

FIGS. 4 and 5 are graphs for explaining loss quantities of the first motor 120 and the second motor 140 provided to the HEV according to an embodiment of the present disclosure.

Referring to FIGS. 4 and 5, a first loss quantity of the first motor 120 and a second loss quantity of the second motor 140 according to an RPM and output torque are respectively illustrated.

When the RPM is 'X' in a low output torque region 'L', a first loss quantity 'l1' of the first motor 120 is smaller than a first loss quantity 'l2', which means that the first motor 120 has higher efficiency than the second motor 140 in the low output operation point region.

When the RPM is 'X' in a high output torque region 'H', a second loss quantity 'h2' of the second motor 140 is smaller than the first loss quantity 'h1' of the first motor 120, this means that the second motor 140 has higher efficiency than the first motor 120 in the high output operation point region.

Figure 6:
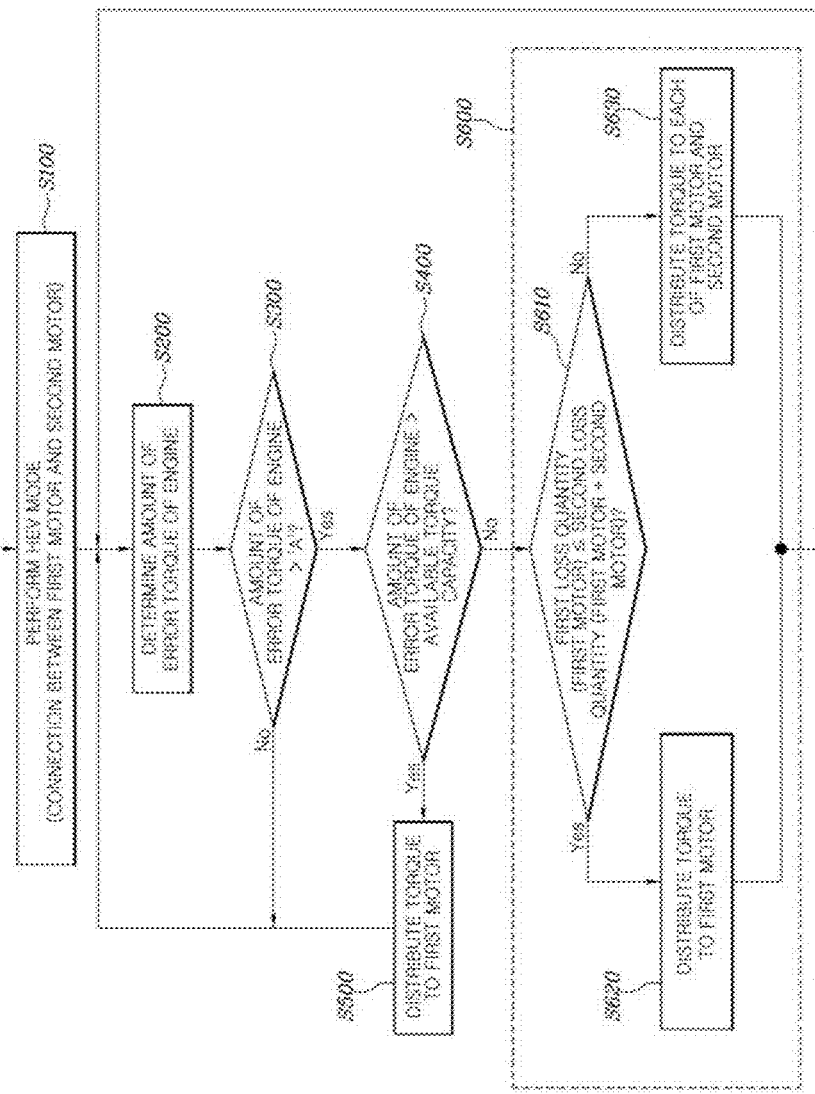
FIG. 6 illustrates a flow chart for explaining a method of controlling a hybrid electric vehicle according to an embodiment of the present disclosure.

FIG. 6 illustrates a flow chart for explaining the method of controlling a hybrid electric vehicle according to an embodiment of the present disclosure.

Referring to FIG. 6, the method of controlling a hybrid electric vehicle may include a step S100 of connecting the first motor 120 with the second motor 140 when performing the HEV mode, a step S200 of determining the amount of the error torque for the engine 110, a step S300 of determining whether or not the amount of the error torque for the engine 110 exceeds a threshold value 'A', a step S400 of comparing the amount of the error torque for the engine 110 with the amount of the error torque for the second motor 140, a step of S500 of compensating the amount of the error torque for the engine 110 through the first motor 120, and a step S600 of deciding a motor intended to compensate the amount of the error torque for the engine 110.

When the drive mode is set to the HEV mode, the first motor 120 directly connected with the engine 110 may be connected with the second motor 140 through fastening of the engine clutch 130 in the connecting step S100.

When the compensation initiation signal is activated in the step S200 of determining the error torque amount for the engine 110, the error torque amount determination unit 243 may determine that a difference between the torque command value of the engine 110 and the output torque value of the engine 110 is the error torque amount of the engine 110. Here, the compensation initiation signal may be activated by the compensation initiation determination unit 241 on the basis of the value of the acceleration pedal sensor (APS), the engine state information, and the engine clutch state information.

The step S300 of determining whether the first compensation control unit 245 may be performed to determine whether or not the amount of the error torque for the engine 110 exceeds the threshold value ('A'). When the amount of the error torque for the engine 110 is smaller than or equal to the threshold value ('A'), the step S200 of determining the amount of the error torque for the engine 110 may be performed again.

When the amount of the error torque for the engine 110 exceeds the preset threshold value (CA') in the determining step S300, the first compensation control unit 245 compares the amount of the error torque for the engine 110 with the available torque capacity for the second motor 140, and thereby may determine whether to being able to compensate the amount of the error torque for the engine 110 through the second motor 140.

When the amount of the error torque for the engine 110 exceeds the available torque capacity of the engine 110 in the comparing step S400, the first compensation control unit 245 may transmit the independent compensation control signal to the torque distribution unit 249 in the compensating step S500, and the torque distribution unit 249 may distribute the amount of the error torque for the engine 110 to the first motor 120. Thereafter, the step S200 of determining the amount of the error torque for the engine 110 may be performed again.

When the amount of the error torque for the engine 110 is less than or equal to the available torque capacity of the engine 110 in the comparing step S400, a step S600 of determining the motor intended to compensate the amount of the error torque for the engine 110 may be performed.

The step S600 of determining the motor intended to compensate the amount of the error torque for the engine 110 may be performed by the second compensation control unit 247 so as to decide whether to distribute the amount of the error torque for the engine 110 to the first motor 120 or each of the first motor 120 and the second motor 140 on the basis of the efficiency of the first motor 120 and the efficiency of the second motor 140.

To be more specific, the step S600 of determining the motor may include a step S610 of determining and comparing the first loss quantity and the second loss quantity, a step S620 of distributing the amount of the error torque for the engine 110 to the first motor 120, and a step S630 of distributing the amount of the error torque for the engine 110 to the first motor 120 and the second motor 140, respectively.

The step S610 of determining and comparing the first loss quantity and the second loss quantity may include a step of determining the first loss quantity generated when the amount of the error torque for the engine 110 is distributed to the first motor 120 on the basis of the efficiency of the first motor 120, a step of determining the second loss quantity generated when the amount of the error torque for the engine 110 is distributed to each of the first motor 120 and the second motor 140 on the basis of the efficiency of the first motor 120 and the efficiency of the second motor 140, and a step of comparing the first loss quantity and the second loss quantity.

When the first loss quantity is less than or equal to the second loss quantity, the second compensation control unit 247 transmits the independent compensation control signal to the torque distribution unit 249 in the step S620 of distributing the amount of the error torque for the engine 110 to the first motor 120, and the torque distribution unit 249 may distribute the amount of the error toque for the engine 110 to the first motor 120. Afterwards, the step S200 of determining the amount of the error toque for the engine 110 may be performed again.

When the first loss quantity exceeds the second loss quantity, the second compensation control unit 247 may transmit the coordinating compensation control signal to the torque distribution unit 249 in the step S630 of distributing the first loss quantity and the second loss quantity to the first motor 120 and the second motor 140 respectively. Afterwards, the step S200 of determining the amount of the error toque for the engine 110 may be performed again.

As mentioned above, the HEV according to the present embodiments selects the motor intended to compensate the error torque with respect to the engine according to the efficiency of each of the plurality of motors, and distributes the amount of the error torque for the engine to the selected motor. Thereby, it is possible to efficiently compensate the loss generated when the error torque for the engine is compensated, and thereby to improve the fuel economy.

Meanwhile, the aforementioned present disclosure may be implemented as one or more codes that may be read on a computer readable medium on which a program may be recorded by a computer. The computer readable medium may include all kinds of recording devices in which data that may be read by a computer system is stored. Examples of the medium which the computer may read include a hard disk drive (HDD), solid state disk (SSD), a silicon disk drive (SDD), a ROM, a RAM, a CD-ROM, a magnetic tape, a floppy disk, an optical data storage device, and so on. Thus, the above detailed description should not be interpreted as being limited in all aspects, and as being illustrative. The scope of the present disclosure should be decided by rational analysis of the attached claims, and all the changes within an equivalent scope of the present disclosure are included in the scope of the present disclosure.

What is claimed is:

1. A method of controlling a hybrid electric vehicle (HEV), the method comprising:
    connecting a first motor with a second motor directly connected with an input end of a transmission, wherein the first motor is directly connected with an engine; and
    determining whether to distribute an amount of error torque of the engine to the first motor or to each of the first motor and the second motor based on an efficiency of the first motor and an efficiency of the second motor.

2. The method according to claim 1, wherein the first motor is connected with the second motor through an engine clutch when a drive mode is set to a HEV mode.

3. The method according to claim 1, wherein:
the efficiency of the first motor is higher than the efficiency of the second motor in a low output operation point region; and
the efficiency of the second motor is higher than the efficiency of the first motor in a high output operation point region.

4. The method according to claim 1, further comprising:
determining a difference between a torque command value of the engine and an output torque value of the engine as the amount of error torque of the engine.

5. The method according to claim 1, wherein determining whether to distribute the amount of error torque is performed when the amount of error torque for the engine exceeds a preset threshold value.

6. The method according to claim 1, wherein determining whether to distribute the amount of error torque comprises:
determining a first loss quantity generated when the amount of error torque for the engine is distributed to the first motor based on the efficiency of the first motor;
determining a second loss quantity generated when the amount of error torque for the engine is distributed to each of the first motor and the second motor based on the efficiency of the first motor and the second motor;
distributing the amount of error torque for the engine to the first motor when the first loss quantity is smaller than the second loss quantity; and
distributing the amount of error torque for the engine to each of the first motor and the second motor when the first loss quantity is larger than the second loss quantity.

7. The method according to claim 1, wherein determining whether to distribute the amount of error torque is performed when the amount of error torque for the engine is less than or equal to an available torque capacity of the second motor.

8. The method according to claim 7, wherein the available torque capacity of the second motor is a difference between a torque limit quantity of the second motor and an output torque value of the second motor.

9. The method according to claim 7, further comprising:
distributing the amount of error torque for the engine to the first motor when the amount of error torque for the engine exceeds the available torque capacity of the second motor.

10. A non-transitory computer-readable recording medium having a program recorded thereon, the program to direct a processor to perform acts of:
connecting a first motor with a second motor directly connected with an input end of a transmission, wherein the first motor is directly connected with an engine of a hybrid electric vehicle (HEV); and
determining whether to distribute an amount of error torque of the engine to the first motor or to each of the first motor and the second motor based on an efficiency of the first motor and an efficiency of the second motor of the HEV.

11. A hybrid electric vehicle (HEV) comprising:
an engine;
a first motor directly connected with the engine;
a second motor configured to be selectively connected with the first motor;
a transmission including an input end which is directly connected with the second motor; and
a control unit configured to determine whether to distribute an amount of error torque of the engine to the first motor or each of the first motor and the second motor based on an efficiency of the first motor and an efficiency of the second motor.

12. The HEV according to claim 11, wherein the first motor is connected with the second motor through an engine clutch when a drive mode is set to a HEV mode.

13. The HEV according to claim 11, wherein:
the efficiency of the first motor is higher than the efficiency of the second motor in a low output operation point region; and
the efficiency of the second motor is higher than the efficiency of the first motor in a high output operation point region.

14. The HEV according to claim 11, wherein the control unit is configured to determine a difference between a torque command value of the engine and an output torque value of the engine as the amount of error torque of the engine.

15. The HEV according to claim 11, wherein the control unit is configured to distribute the amount of error torque for the engine when the amount of error torque for the engine exceeds a preset threshold value.

16. The HEV according to claim 11, wherein the control unit is configured to:
determine a first loss quantity generated when the amount of error torque is distributed to the first motor based on the efficiency of the first motor;
determine a second loss quantity generated when the amount of error torque for the engine is distributed to each of the first motor and the second motor based on the efficiency of the first motor and the second motor;
distribute the amount of error torque for the engine to the first motor when the first loss quantity is smaller than the second loss quantity; and
distribute the amount of error torque for the engine to each of the first motor and the second motor when the first loss quantity is larger than the second loss quantity.

17. The HEV according to claim 11, wherein the control unit is configured to determine whether to distribute the amount of error torque for the engine to the first motor or each of the first motor and the second motor based on the efficiency of the first motor and the efficiency of the second motor when the amount of error torque for the engine is lower than or equal to an available torque capacity of the second motor.

18. The HEV according to claim 17, wherein the available torque capacity of the second motor is a difference between a torque limit quantity of the second motor and an output torque value of the second motor.

19. The HEV according to claim 17, wherein the control unit is configured to distribute the amount of error torque for the engine to the first motor when the amount of error torque for the engine exceeds the available torque capacity of the second motor.

* * * * *